Figure 1:
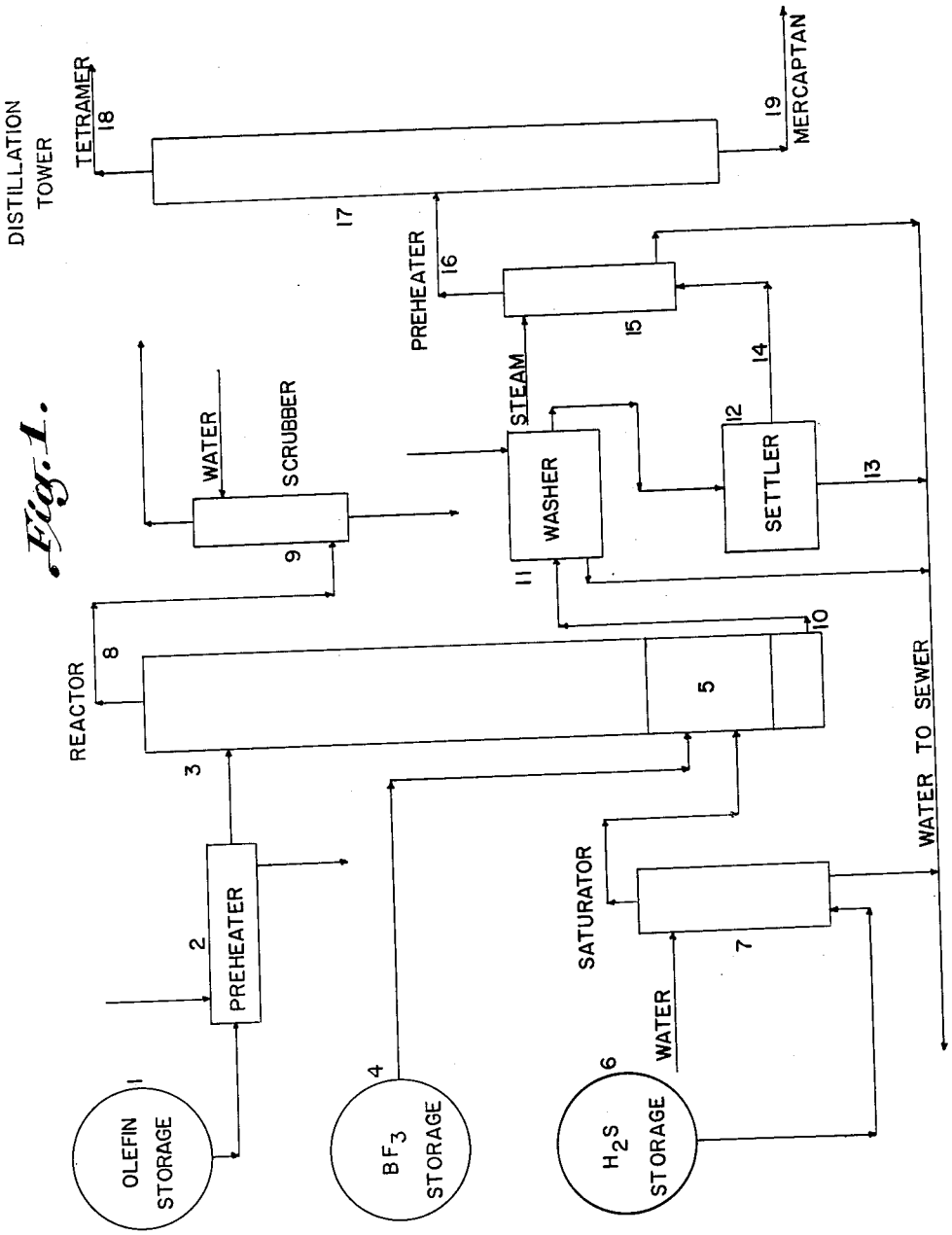

May 1, 1962

J. F. FRANTZ ETAL 3,032,592

MANUFACTURE OF SULFUR COMPOUNDS

Filed June 3, 1959

2 Sheets-Sheet 1

INVENTORS
KING I. GLASS
JOSEPH F. FRANTZ

BY
ATTORNEY

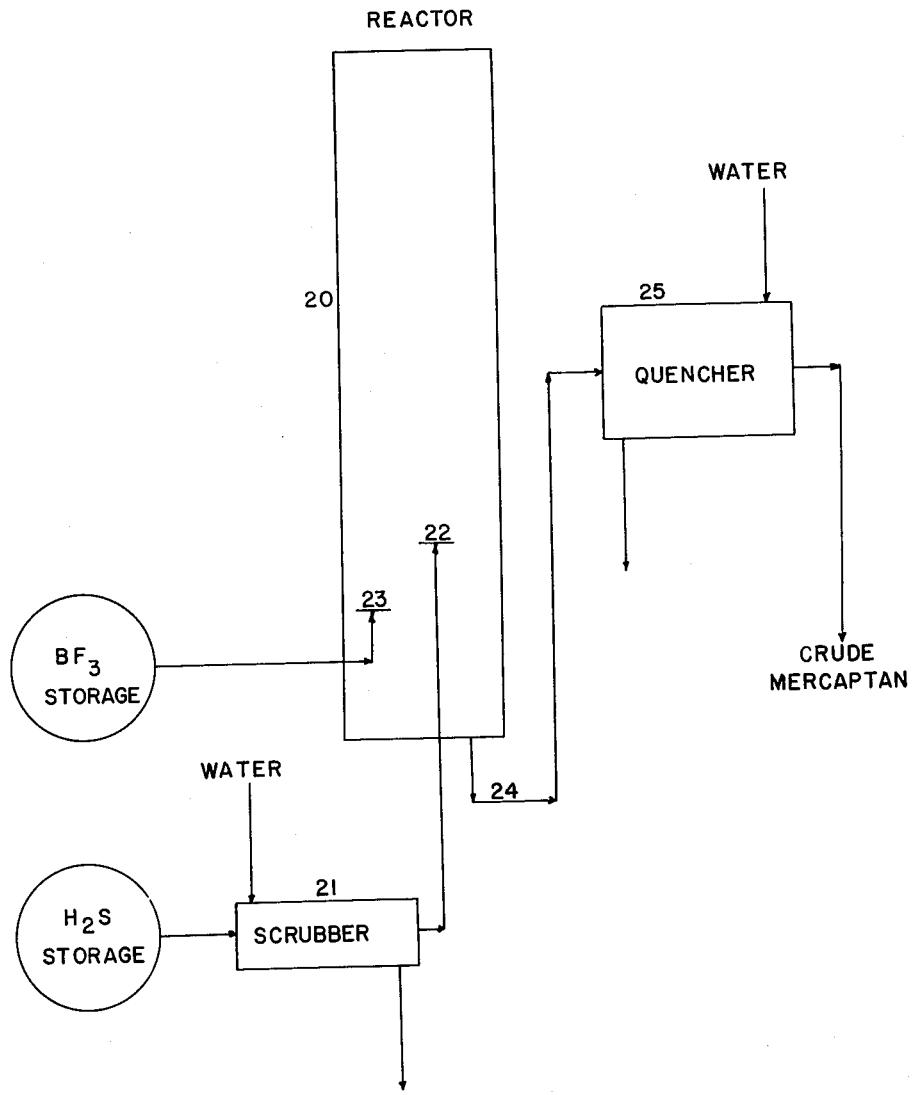

United States Patent Office

3,032,592
MANUFACTURE OF SULFUR COMPOUNDS
Joseph F. Frantz and King I. Glass, El Dorado, Ark., assignors to Monsanto Chemical Company, St. Louis, Mo., a corporation of Delaware
Filed June 3, 1959, Ser. No. 817,853
3 Claims. (Cl. 260—609)

This invention relates to the manufacture of organic sulfur compounds and more particularly to the preparation of alkyl mercaptans.

The synthesis of alkyl mercaptans by the addition of hydrogen sulfide to olefinic materials in the presence of a catalyst is well known in the art. The more significant processes of commercial importance generally utilize rather extreme reaction conditions. Boron trifluoride has proven to be an interesting catalyst for this reaction, and has been investigated by a number of investigators. It has proven to be a sensitive catalytic material, very difficult to handle in this particular reaction. A further improved catalyst system has been found utilizing a boron trifluoride-water system as the catalyst. This catalyst system is even more active than boron trifluoride per se but much more easily controlled. Because of particular techniques required to form a boron trifluoride-water catalyst system, continuous processes for the production of alkyl mercaptans utilizing this catalyst system have not heretofore proven feasible. The use of the boron trifluoride-water catalyst system has been limited almost exclusively to batch operations and even here in such limited application, particularly carefully controlled conditions of reaction were found to be necessary. For example, it has been found that the boron trifluoride must be introduced into the liquid olefin in a manner such that the boron trifluoride is mixed with the olefin before contact of the $BF_3$ with the $H_2S$ stream feed. It is an object of this invention to provide an improved continuous process for the production of alkyl mercaptans. Further objects will become apparent from the description of this invention.

It has now been discovered that excellent yields of alkyl mercaptans can be obtained by continuously introducing an olefin into the upper portion of a packed column, continuously introducing a mixture of $BF_3$, water vapor and $H_2S$ into a vapor space in the bottom of the packed column and flowing said mixture upwardly through said column counter-currently contacting the descending liquid olefin, said $BF_3$ being employed in the molar ratio of $H_2S:BF_3$ of from about 10:1 to about 100:1 and water being employed in the molar ratio of $H_2O:BF_3$ of from about 0.5:1 to about 2:1.

FIGURE 1 is a schematic drawing of the reaction system particularly suited for the process of this invention. FIGURE 2 is a schematic drawing of a reaction system employing the $BF_3$-water catalyst system in a batch process and is shown for comparative purposes.

Example I

Using the system shown in FIGURE 1, propylene tetramer from olefin storage 1 is pumped to preheater 2 where it is heated to a temperature of approximately 45° C. From the preheater, the tetramer is introduced into the top portion of reactor 3. Reactor column 3 is packed with approximately 14 feet of ¼" Berl saddles. Tetramer is fed to the reactor column at the rate of from 250 to 750 pounds per hour per square foot. The reactor column is maintained at a temperature of from about 70° C. to about 90° C. The reactor column is maintained at atmospheric pressure. Boron trifluoride from storage 4 is introduced at ambient temperature into the vapor space 5 at the bottom of reactor column 3. Hydrogen sulfide from storage 6 is passed through water saturator 7 and then into vapor space 5 at the bottom of reactor column 3. The water saturator is maintained at approximately 30° C. and 5 p.s.i.g. thereby resulting in a hydrogen sulfide stream containing 3 mol percent of water vapor. Hydrogen sulfide is fed to the reactor column at the rate of one mol of hydrogen sulfide per mol of propylene tetramer and boron trifluoride is fed at the rate of 3.5 mol percent of the hydrogen sulfide feed. The gaseous mixture of hydrogen sulfide, water and boron trifluoride pass upwardly through the reactor column countercurrently contacting the propylene tetramer flowing down the column. The off-gas from the reactor column passes via line 8 to water scrubber 9 to remove boron trifluoride. Crude dodecyl mercaptan is removed from the bottom of reactor column 3 through line 10 and passed to water washer 11. The mixture of dodecyl mercaptan and water is passed to settling tank 12 and the water layer removed via line 13 and the water washed dodecyl mercaptan layer passed via line 14 to preheater 15. From preheater 15, the crude dodecyl mercaptan is introduced via line 16 into an intermediate section of a bubble cap tray fractionating column. The column 17 is operated under a reduced pressure so as to maintain a bottoms temperature not in excess of 210° C. Unreacted propylene tetramer containing about 10% by weight of dodecyl mercaptan is removed through line 18 and finished product dodecyl mercaptan, assaying about 96%, is removed from the bottom portion of the column through line 19.

This continuous process results in an 85% conversion of the $H_2S$ to dodecyl mercaptan and an 85% conversion of propylene tetramer to dodecyl mercaptan which assays 87 weight percent dodecyl mercaptan, as determined on the crude product prior to washing. One part by weight of dodecyl mercaptan is obtained for each part by weight of tetramer charged. The crude dodecyl mercaptan has an ASTM boiling range of 360° F. to 488° F.

The advantages of the novel process of this invention will become readily apparent by comparing the results obtained in Example I with those obtained in Example II.

Example II

Referring to FIGURE 2, the reactor 20 is charged with fifty pounds of propylene tetramer. $H_2S$ is passed through water scrubber 21 picking up water and the wet $H_2S$ then passed into the reactor through diffuser 22. The $H_2S$ is bubbled through the water at room temperature and passed into the olefin at the rate of one cubic foot per minute. $BF_3$ is introduced into the reactor through diffuser 23 at the rate of .02 cubic foot per minute. The $H_2S:BF_3$ molar ratio is about 50:1 and the $H_2O:BF_3$ molar ratio is about 1:1. The initial reaction temperature is 25° C. and the temperature rises to approximately 55°–60° C. during the reaction. At the end of three hours, the crude mercaptan is removed from the reactor through line 24 into tank 25 which contains water to quench the catalyst. The crude mercaptan layer is separated from the water layer. The crude product assays 78 weight percent dodecyl mercaptan. The crude material is then further purified by fractionation in the manner described in Example I. In this process a 75% conversion of the propylene tetramer to dodecyl mercaptan is obtained with an ultimate yield of 0.74 pound of dodecyl mercaptan obtained for each pound of propylene tetramer charged, as determined on the crude material. The crude product had a boiling range of 368° F. to 606° F. indicating significantly greater polymer formation in this process than was obtained in the process carried out according to Example I.

Example III

The procedure set forth in Example I using as the olefin a 338°–360° F. cut of heavy polymer from a catalytic polymerization unit charging refinery propylene and butylenes. An excellent yield of the corresponding mercaptan is obtained.

*Example IV*

The procedure set forth in Example I is repeated using as the olefin a natural gasoline fraction containing about 15 weight percent triisobutylene. An excellent yield of triisobutyl mercaptan is obtained.

*Example V*

The procedure set forth in Example I is repeated using cyclohexene as the olefin. An excellent yield of cyclohexylmercaptan is obtained.

The reaction conditions set forth in the preceding examples are subject to some variations. The reaction temperature can be varied substantially. Reaction temperatures ranging from about 20° C. to about 100° C. have been found suitable although considerably higher or lower temperatures can be used if desired. Particularly advantageous results are obtained when the reaction temperature is maintained in the range of from about 55° C. to about 95° C. The reaction is conveniently carried out at atmospheric pressure, although pressures above or below atmospheric can be used if desired in a particular case. Pressure is not a critical limitation.

The reactor column used in the process of this invention may be either a plate or packed column. Packed columns have proven to be particularly advantageous. The packing can be of any suitable material of construction, with ceramic, aluminum and stainless steel being particularly useful in this process. The crude mercaptan can be purified by any technique well known to those skilled in the art. Removal of catalyst by simple water or caustic washing followed by fractionation is a particularly simple and economic means of purification. The fractionating column can be either of plate or packed construction. To prevent decomposition of the mercaptan, purification by fractionation is preferably carried out under reduced pressures and at temperatures below about 210° C.

The olefins which may be reacted with $H_2S$ in accordance with this invention include those which contain one or more olefinic unsaturations between two aliphatic carbon atoms regardless of the class or characteristic of the compound containing such linkage. Such hydrocarbons can also contain substituent groups which are inert under the reaction conditions. Examples of olefins which can be used in this process are ethylene, propylene, butylenes, pentenes, hexenes, cyclohexene, 1-methylcyclohexene-1; propylene trimers, propylene tetramers and propylene pentamers; diisobutylenes such as 2,4,4-trimethylpentene-1, and 2,4,4-trimethylpentene-2, octene-1 and -2; triisobutylenes such as 2,2,4,6,6-pentamethylheptene-3, dodecene-1 and -2, 2,2-n-pentyl-4,4-dimethylpentene-1,2,4,4,6,6-pentamethylheptene-2 and -1; 1,4-diphenylbutene-2; tetraisobutylenes such as cetene-1 and -2; and their homologues and analogues. The olefins can be used as such or can be mixed with inert hydrocarbons.

What is claimed is:
1. A continuous proces for the production of dodecyl mercaptan which comprises passing a liquid propylene tetramer downwardly through a reaction column, continuously introducing a mixture of $BF_3$, $H_2S$ and water vapor into a vapor space in the lower portion of said reaction column, passing said mixture upwardly through said column counter-currently contacting the descending propylene tetramer while maintaining the reaction temperature in a range from about 20° C. to about 100° C. and removing dodecyl mercaptan from the lower portion of said reactor column by fractional distillation at a temperature below 210° C., the $BF_3$ being employed in the molar ratio of $H_2S:BF_3$ of from about 10:1 to about 100:1 and the $H_2O$ being employed in the molar ratio of $H_2O:BF_3$ of from about 0.5:1 to about 2:1.

2. A process as described in claim 1 wherein the olefin is a propylene polymer.

3. A process as described in claim 1 wherein the olefin is a propylene tetramer.

References Cited in the file of this patent

UNITED STATES PATENTS

| | | |
|---|---|---|
| 2,426,648 | Shulze et al. | Sept. 2, 1947 |
| 2,479,996 | Bell et al. | Aug. 23, 1949 |

FOREIGN PATENTS

| | | |
|---|---|---|
| 471,371 | Canada | Feb. 6, 1951 |